US 6,654,217 B2

United States Patent
Zylstra et al.

(10) Patent No.: US 6,654,217 B2
(45) Date of Patent: Nov. 25, 2003

(54) QUICK RESPONDING INSTANTANEOUS TRIP SYSTEM

(75) Inventors: Henry J. Zylstra, Alburnett, IA (US); Charles D. Bettis, Cedar Rapids, IA (US); David J. Dunne, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 173 days.

(21) Appl. No.: 09/752,803

(22) Filed: Dec. 29, 2000

(65) Prior Publication Data

US 2002/0085330 A1 Jul. 4, 2002

(51) Int. Cl.[7] ............................ H02H 3/18; G01R 31/08
(52) U.S. Cl. ........................ 361/77; 361/78; 361/82; 361/87; 324/536
(58) Field of Search ........................ 361/78.84, 82, 361/93.1, 93.6, 42, 93.9, 76, 78; 324/508, 509, 536

(56) References Cited

U.S. PATENT DOCUMENTS 6,373,257 B1 * 4/2002 Macbeth et al. ............ 324/536

* cited by examiner

Primary Examiner—Kim Huynh
(74) Attorney, Agent, or Firm—Kareem M. Irfan; Larry I. Golden

(57) ABSTRACT

An assembly and method is provided for a tripping mechanism of an circuit breaker to limit the damage to a protected circuit breaker and other associated equipment such as enclosures, bus way, etc. from the high forces that result from high currents and prevent unwanted tripping of a circuit breaker due to rapidly decreasing currents. A trip system for a circuit breaker including a sensor to determine a rate of change in the current level. A positive detector is connected to the sensor to determine a positive current direction. A negative detector is connected to the sensor to determine a negative current direction. An electronic switch connected to the positive and negative sensors to activate the tripping mechanism of the circuit breaker. A power supply is connected to the tripping mechanism and electronic switch. Preferably a current delimiter applies a high voltage initially to an inductive device such as a tripping solenoid to effect a quick response but then limit the current to prevent damage to the tripping solenoid.

15 Claims, 8 Drawing Sheets

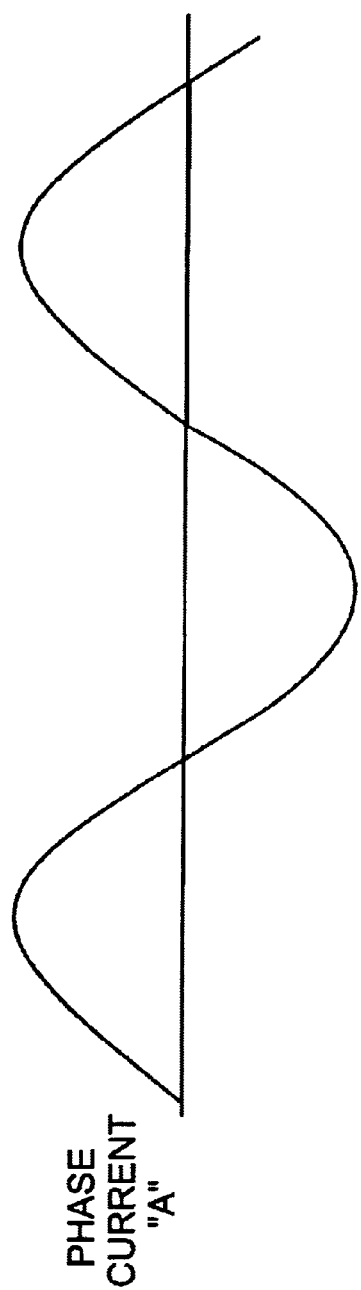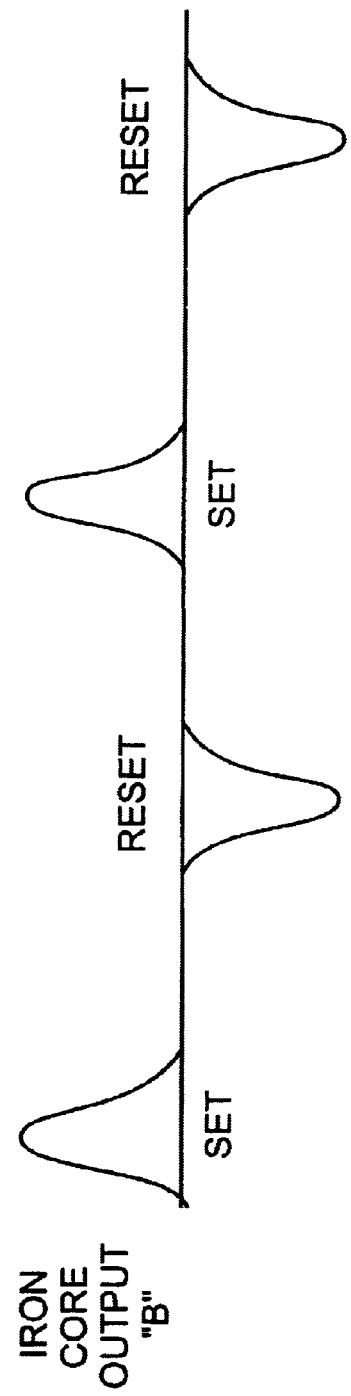

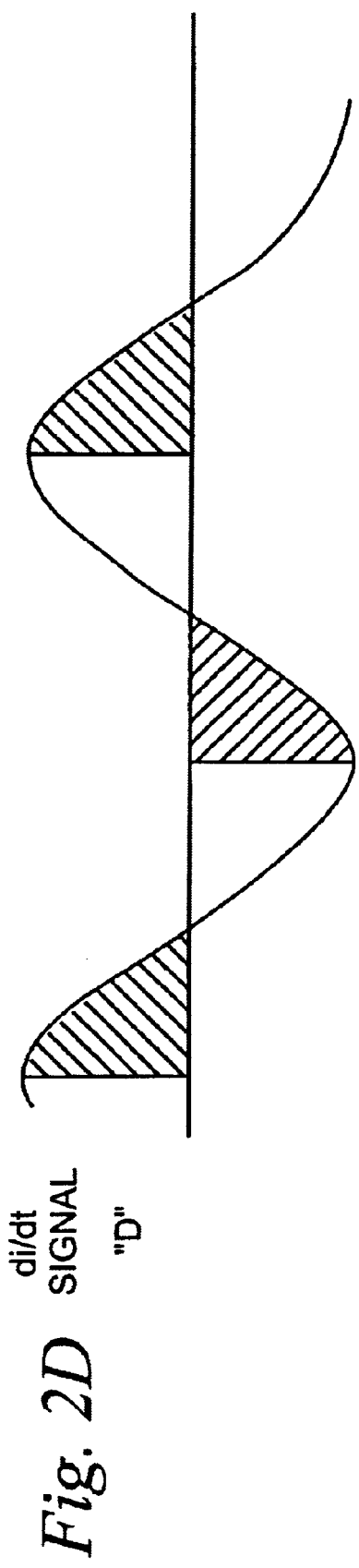
Fig. 2C
Fig. 2D

QUICK RESPONDING INSTANTANEOUS TRIP SYSTEM

FIELD OF THE INVENTION

This invention relates to an assembly and method for a tripping mechanism of an circuit breaker to limit the damage to a protected circuit breaker and other associated equipment such as enclosures, bus way, etc. from the high forces that result from high currents and prevent unwanted tripping of a circuit breaker due to rapidly decreasing currents

BACKGROUND OF THE INVENTION

Circuit breakers use various trip mechanisms to disconnect the circuit when a pre-determined event has occurred. Often the components of the trip mechanism are required to move at a high velocity as the result of a trip event and impact one another causing stress which can lead to structural or mechanical failure of one of more of the components.

Some circuit breakers use a trip mechanism which includes an electro-magnet which generates high magnetic forces when subjected to high fault currents in a circuit. The magnetic forces attract an armature or other similar component in order to close a gap between the armature and the electro-magnet. Displacement of the armature causes it to travel and impact another component such as a tripbar to continue the tripping sequence. The velocity of the armature travel can result in breaking the tripbar or armature. This is particularly a problem when the components such as the tripbar are made of a plastic material like a high glass thermal set phenoic.

There is a need for limiting the damage to a protected circuit breaker and other associated equipment such as enclosures, bus way, etc. from the high forces that result from high currents. It is also desirable to prevent unwanted tripping of a circuit breaker due to rapidly decreasing currents.

SUMMARY OF THE INVENTION

The present invention provides a trip system for a circuit breaker including a sensor to determine a rate of change in the current level. A positive detector is connected to the sensor to determine a positive current direction. A negative detector is connected to the sensor to determine a negative current direction. An electronic switch connected to the positive and negative sensors to activate the tripping mechanism of the circuit breaker. A power supply is connected to the tripping mechanism and electronic switch. Preferably a current delimiter applies a high voltage initially to an inductive device such as a tripping solenoid to effect a quick response but then limit the current to prevent damage to the tripping solenoid.

Advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure, but are not to scale:

FIG. 2A illustrates the phase current as waveform A;

FIG. 2B illustrates the output of the iron core 26 as a series of pulses as waveform B;

FIG. 2C illustrates, subsequent to a set or positive pulse, the declining circuit inhibitor circuit inhibiting the negative direction signal and after a reset, the positive direction signal is inhibited;

FIG. 2D illustrates the shaded portions of waveform D indicating desensitization;

DETAILED DESCRIPTION OF THE INVENTION

Figure 1:
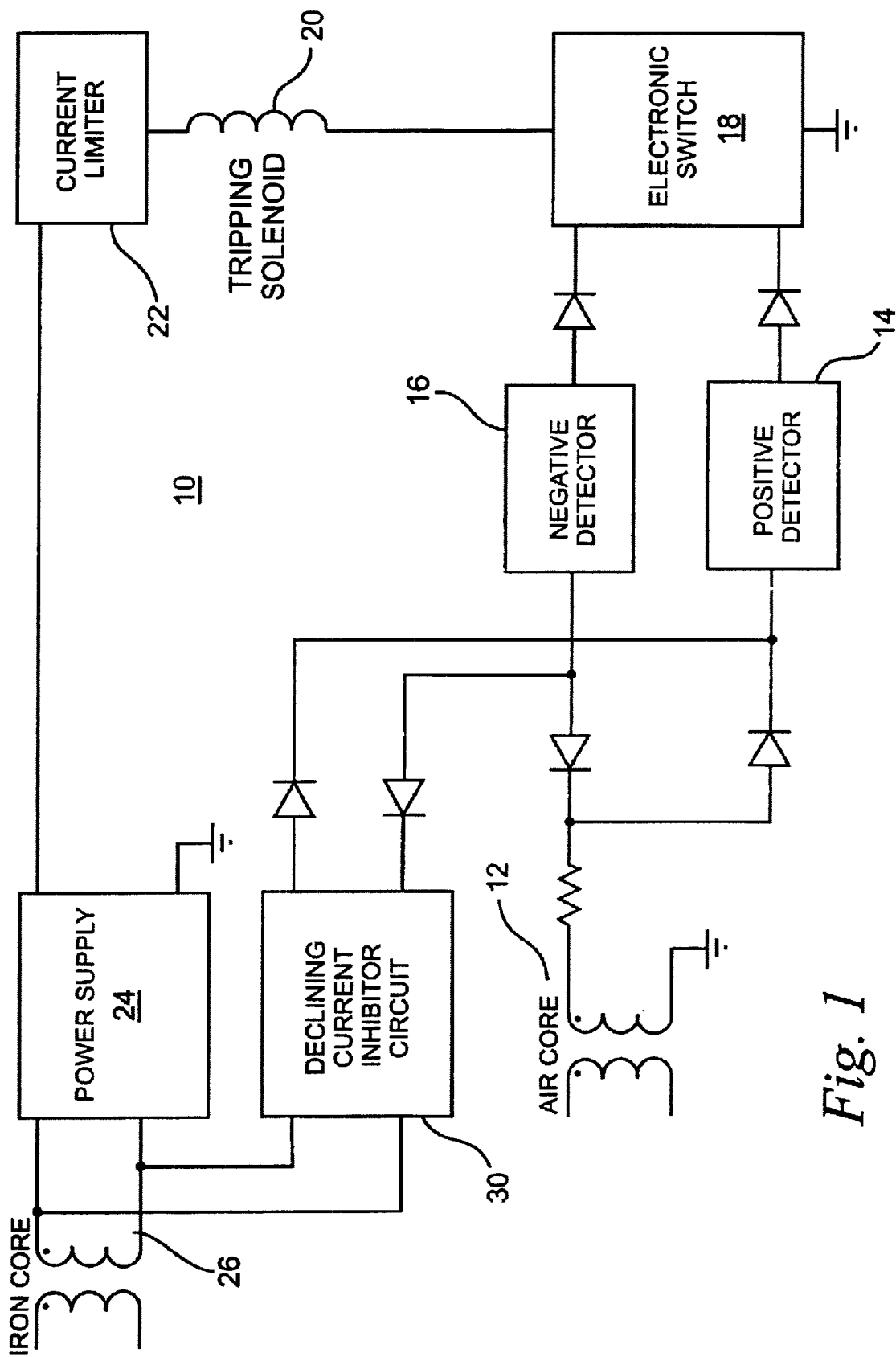
FIG. 1 is a block diagram of the inventive instantaneous trip system.

Generally, the present invention limits the damage to a protected circuit breaker and other associated equipment such as enclosures, bus way, etc. from the high forces that result from high currents. Unwanted tripping of a circuit breaker due to rapidly decreasing currents is also prevented. FIG. 1 is a block diagram illustrating the operation of the inventive trip system 10 for a single phase circuit breaker. The level of current is sensed by a rate of change coil or sensing coil 12 that provides a very quick measurement of the current level. The signal from the rate of change coil 12 is applied to both a positive detector 14 and a negative detector 16 to sense the current in either the positive or negative direction. The positive and negative detectors 14, 16 also provide a level sense function that results in a signal generated to the electronic switch 18. In turn, the electronic switch 18 energizes a flux transfer type of trip solenoid 20 that can then act upon the mechanical trip latch of the circuit breaker. The energy for activating the tripping mechanism of the circuit breaker is supplied by a quick acting power supply 24 through a current limiter 22. Conventional transformers 26 are connected to the power supply 24. Although FIG. 1 described the inventive trip system for a single phase circuit breaker, it is within those skilled in the art to modify this diagram for multiple phase systems by using all of the components herein described except for the current limiter 22, tripping solenoid 20, and electronic switch 18.

As a result of the sensing coil 12 responding to the rate of change of the current in the circuit 10, there is an output generated whether the current is increasing or decreasing as illustrating in FIG. 2A. A declining circuit inhibitor circuit 30 allows the circuit 10 to respond to only to increasing current defined as current increasing in either the positive or negative direction from zero. The portion of this term increasing current that comprises of the current actually decreasing toward zero is inhibited. A particularly high rate of the current actually decreasing toward zero is present when either an upstream or downstream breaker interrupts a high current. Without the declining circuit inhibitor 30, a high rate of current actually decreasing toward zero could result in the tripping mechanism activating as a result of either an upstream or downstream breaker interrupting a high current. FIG. 2A illustrates the phase current as waveform A. Since the iron core 26 is saturating in the sensing region, the output of the iron core 26 is a series of pulses illustrated in FIG. 2B as waveform B. The declining circuit inhibitor circuit 30 either sets or resets depending on the direction of these pulses. As illustrated in FIG. 2C, subsequent to a set or positive pulse, the declining circuit inhibitor circuit 30 inhibits the negative direction signal and after a reset, the positive direction signal is inhibited. In FIG. 2D, the shaded portions of waveform D indicates desensitization.

The system 10 provides the current limiter 22 on the power supplied to the tripping solenoid 20 which is an inductive element. If a constant voltage is applied to the tripping solenoid 20 it will respond slowly. If a relatively high voltage is applied to the tripping solenoid 20 there is a possibility of demagnetizing its permanent magnet in the flux transfer solenoid. The present invention obviates these potential problems by applying a high voltage initially to effect a quick response but then limit the current to prevent damage to the tripping solenoid 20.

Figure 3:
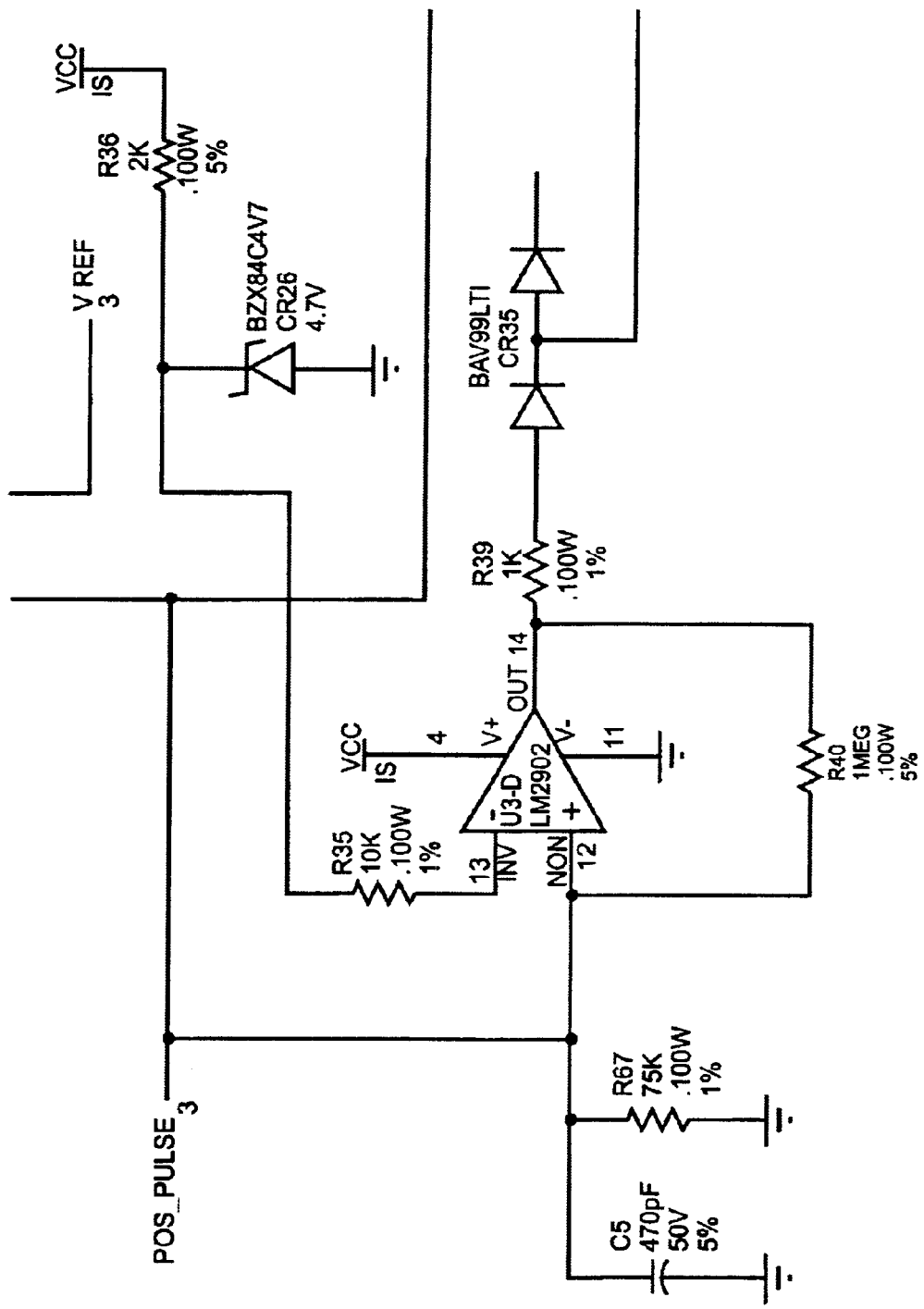
FIG. 3 is circuit diagram providing a more details of sensing the positive output of the sensing coil of the inventive trip system.
Figure 5:
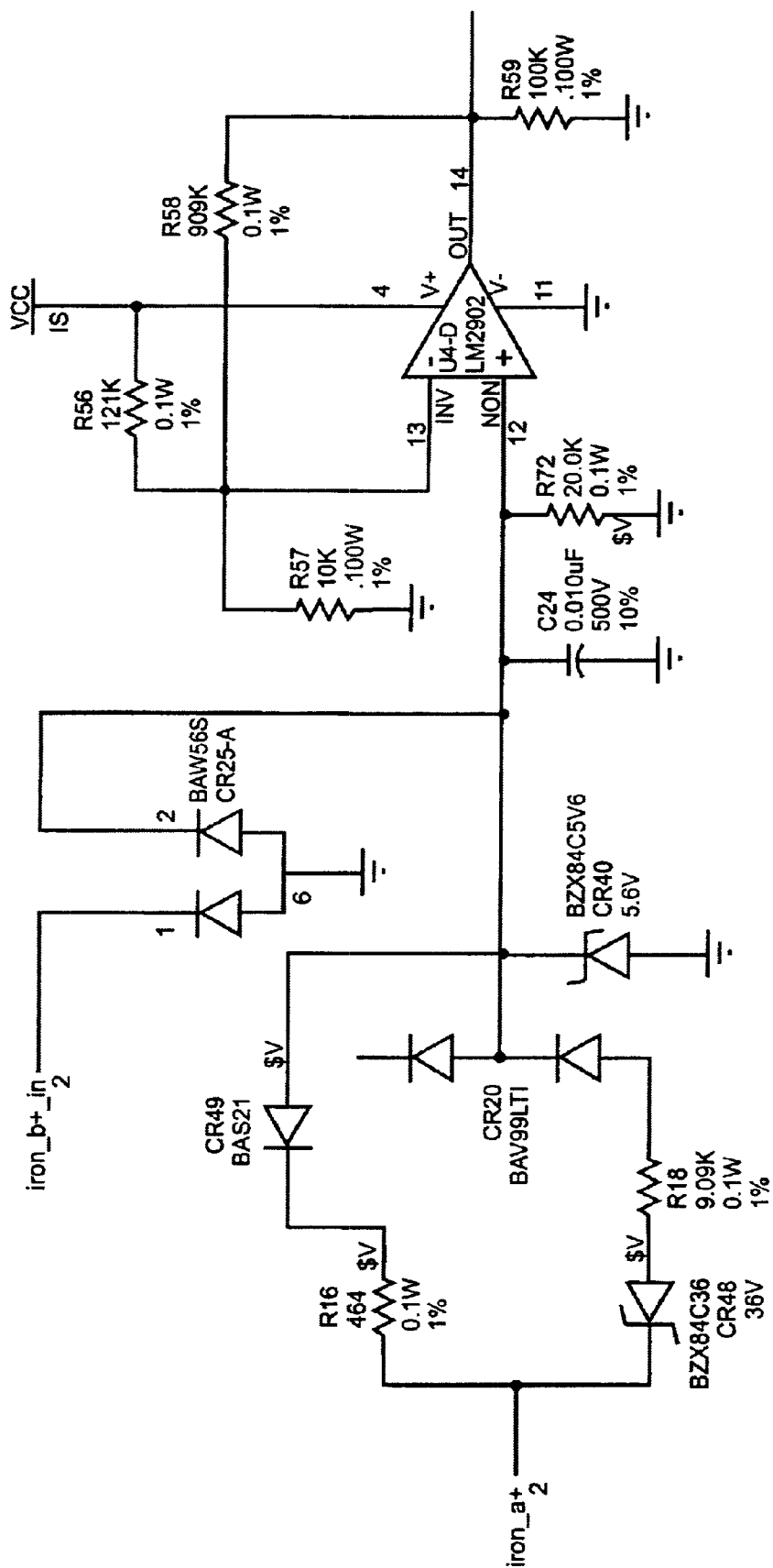
FIG. 5 is a circuit diagram of a declining circuit inhibitor circuit of the inventive trip system.

FIG. 3 provides a more detailed operation of sensing the positive output of the sensing coil 12. The output signal generated by the sensing coil 12 for each breaker pole a, b, c, and n is applied to diodes CR39A2, CR9A2, CR39B2, and CR9B2, respectively. The connections to each respective declining circuit inhibitor circuit 30 are made through diodes CR39A1, CR9A1, CR39B1 and CR9B1 for the poles a, b, c, and n respectively. The detail of the declining circuit inhibitor circuit 30 is illustrated in FIG. 5. The inputs are applied to the non-inverting terminal of the Op-amp U3-D. The capacitor C5 provides delay as well as a filter for high frequency disturbances. If the peak of the signal exceeds a predetermined reference voltage, for example 5.1 volts, the output of the op-amp changes from a low state to a high state sending a positive tripping signal to the electronic switch 18. Diode CR35 provides the OR function combining it with the out of the other detectors. R40 then provides an unambiguous output from the op-amp hysteresis.

Figure 4:
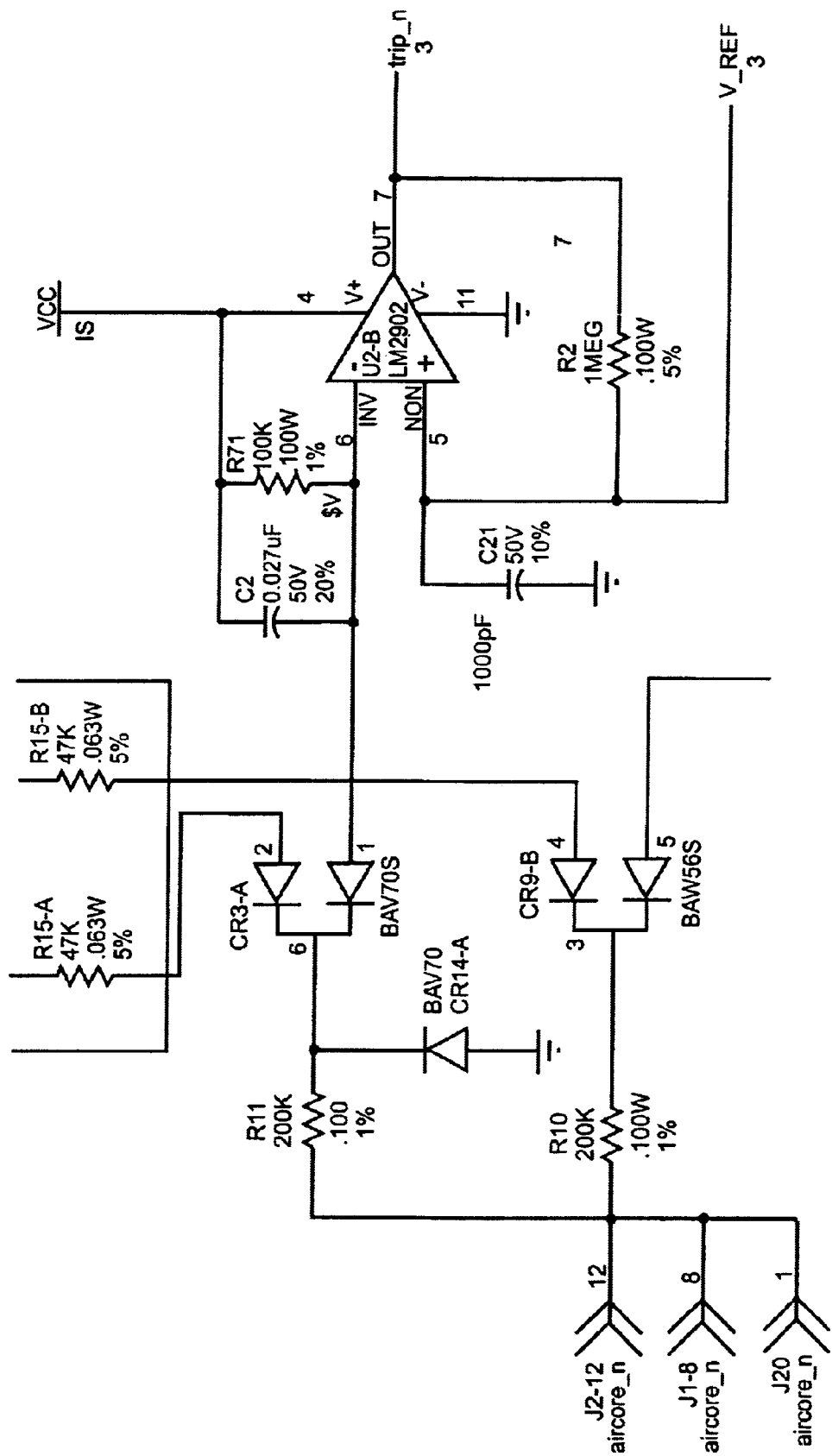
FIG. 4 is a circuit diagram providing the detail of the negative peak detector of the inventive trip system.

FIG. 4 provides the detail of the negative peak detector 16. An independent circuit is required for each of the poles a, b, c, and n. The operation of the negative detector for phase n is now described; as the operation of the poles a, b, and c are identical. The negative output of the sensing coil 12 is applied to the inverting input of the op-amp U2-B through resistor R11, diode CR3-A and resistor R71. Filtering and time delay is provided by C2. Resistors R11 and R71 form a voltage divider. As the input from the sensor is increased, the voltage applied to the inverting input decreases becoming less positive. With no input, the voltage applied to the inverting input is nominally predetermined limit such as about 9.5 volts. When this voltage is pulled down to the reference on the noninverting input of about 2.3 volts, the op-amp changes and a positive signal is applied to the electronic switch 18. Resistor R2 provides some positive feedback and gives the stage hysteresis. The inhibit signal is applied though diode CR3-A and is further described in reference to FIG. 5. The diode CR14A provides a clamp to prevent this point from going below the ground.

The declining circuit inhibitor circuit 30 is further described in FIG. 5. The declining circuit inhibitor circuit 30 is applied to both the positive and negative detectors 14 and 16 of phase c; the operation of the other phases being identical. The input connections are made to the iron core transformer 26 that supplies power to the system 10. The transformer 26 is in the saturation region in the range the system 10 operates. The output of the op-amp U4-D is applied to the inhibit lines for both the positive and negative detectors 14 and 16 through separate resistors. The operation of the circuit is to set and reset. The set condition results in the output of the op-amp being high and thereby inhibits the negative detector 16 by providing a voltage through resistor R51A. A reset condition inhibits the positive detector 14 be providing a ground to the positive to the positive detector 14 through resistor R51-B. To set this condition, a positive pulse for the transformer 26 is applied through the zener diodes CR48, CR20 and resistor R18 to charge the capacitor C24. Preferably, the set pulse would be very narrow and occurs at zero current. The zener diode effectively shortens this pulse by passing through only a part of the pulse. As a result, the output of the op-amp goes to a high state. The op-amp remains in the high state while the capacitors slowly discharge through R12 and R72. At the following zero crossing, the output of the transformer is negative and discharging the capacitor through R16 and diode CR49 results in the capacitor C24 discharging. Then the noninverting input being lower than the inverting input and the output of the op-amp being low. The reference at the inverting input is typically around 1.1 volts. Resistor divider R56 and R57 provides the reference to the inverting input of the op-amp and resistor R58 determines the gain of the op-amp.

Figure 6:
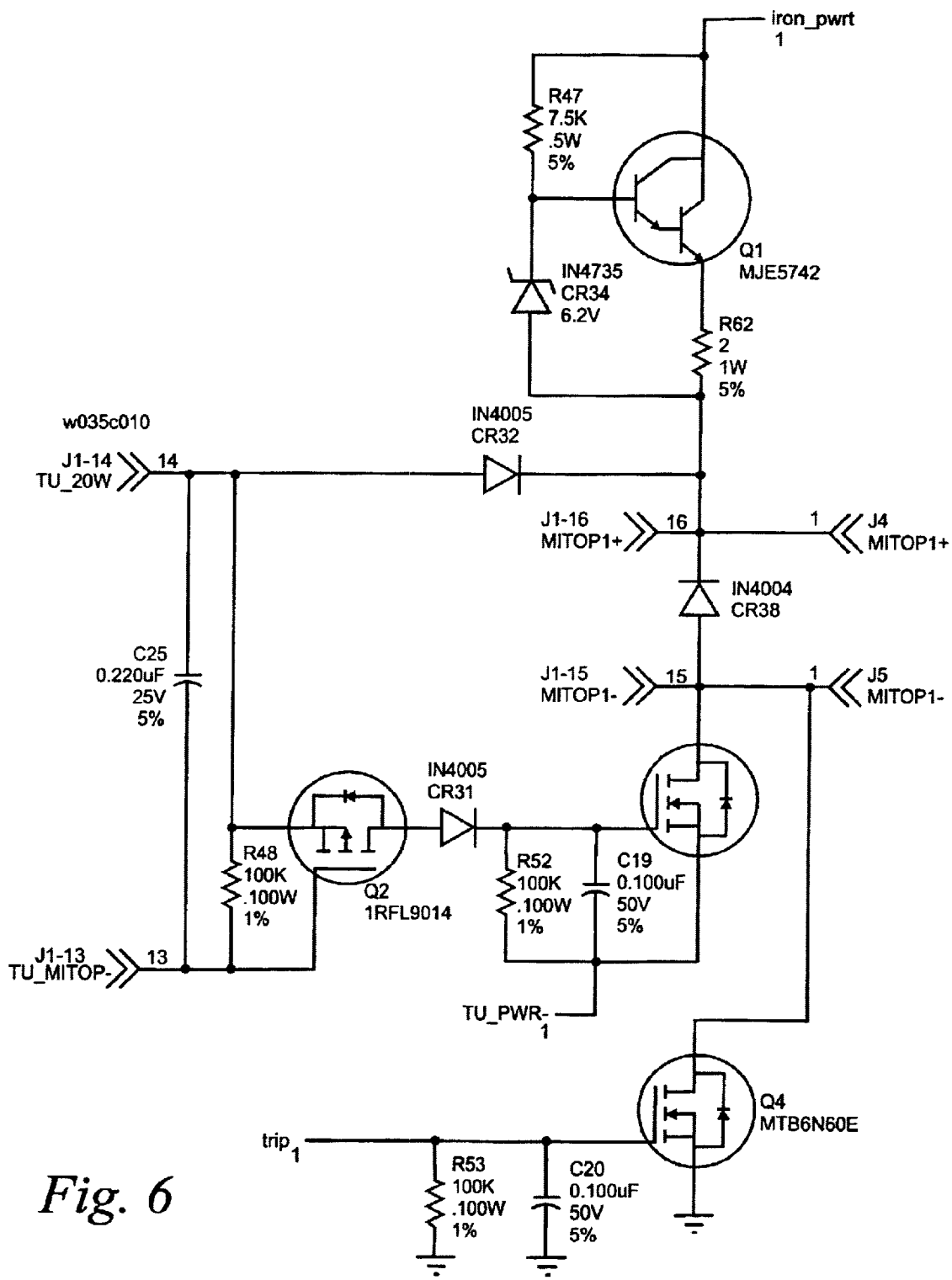
FIG. 6 is a circuit diagram of the current limiter and the electronic switch components of the inventive trip system.

The current limiter 22 and the electronic switch 18 are described in more detail in FIG. 6. The current limiter 22 and electronic switch 18 provide the following functions: limit the current that is applied to the tripping solenoid 20 and L1, energize the tripping solenoid as a result of an input from the positive and negative detectors 14 and 16, and energize the tripping solenoid as a result of an input from an associated control unit. The current limiter 22 circuit includes R47, R62, CR34, and Q1. Voltage is applied to the collector of Q1 and the current is supplied to the base terminal of Q1 through R47. The current passing though the collector and the emitter terminals is in turn applied to the trip solenoid 20. As the current passing through R62 increases, the drive applied to the base-emitter is decreased. Equilibrium is reached when the base-emitter voltage plus the voltage across R62 equals the drop across the zener diode. Current from R47 is diverted into the zener diode and the voltage across R62 increases. Typically this occurs with about 2 amps passing through R62. Changing the values of R62 or the zener diode CR34 is within those skilled in the art to change the current limit value. The current delimiter 22 circuit allows a high voltage to be applied to the tripping solenoid 20 for the fastest response but limits the current to a level that does not damage the permanent magnet of the tripping solenoid.

The electronic switch 18 responds to input from the positive and negative detectors 14 and 16 by activating Q4 with a positive pulse to the gate resulting in the energization of the solenoid L1. The solenoid can also be activated from an associated control unit by applying a supply voltage of about 20 volts between J2–3 (positive) and J2–4 (control unit common). With no input from the control unit trip circuit, the gate of the transistor Q2 will be biased at about 20 volts and the Q2 will not conduct. A signal from the control unit pulling the terminal J1–13 to the control common will result in Q4 conducting and energizing Q3 resulting in the energization of the trip solenoid L1. The two tripping functions are independent of one another.

Figure 7:
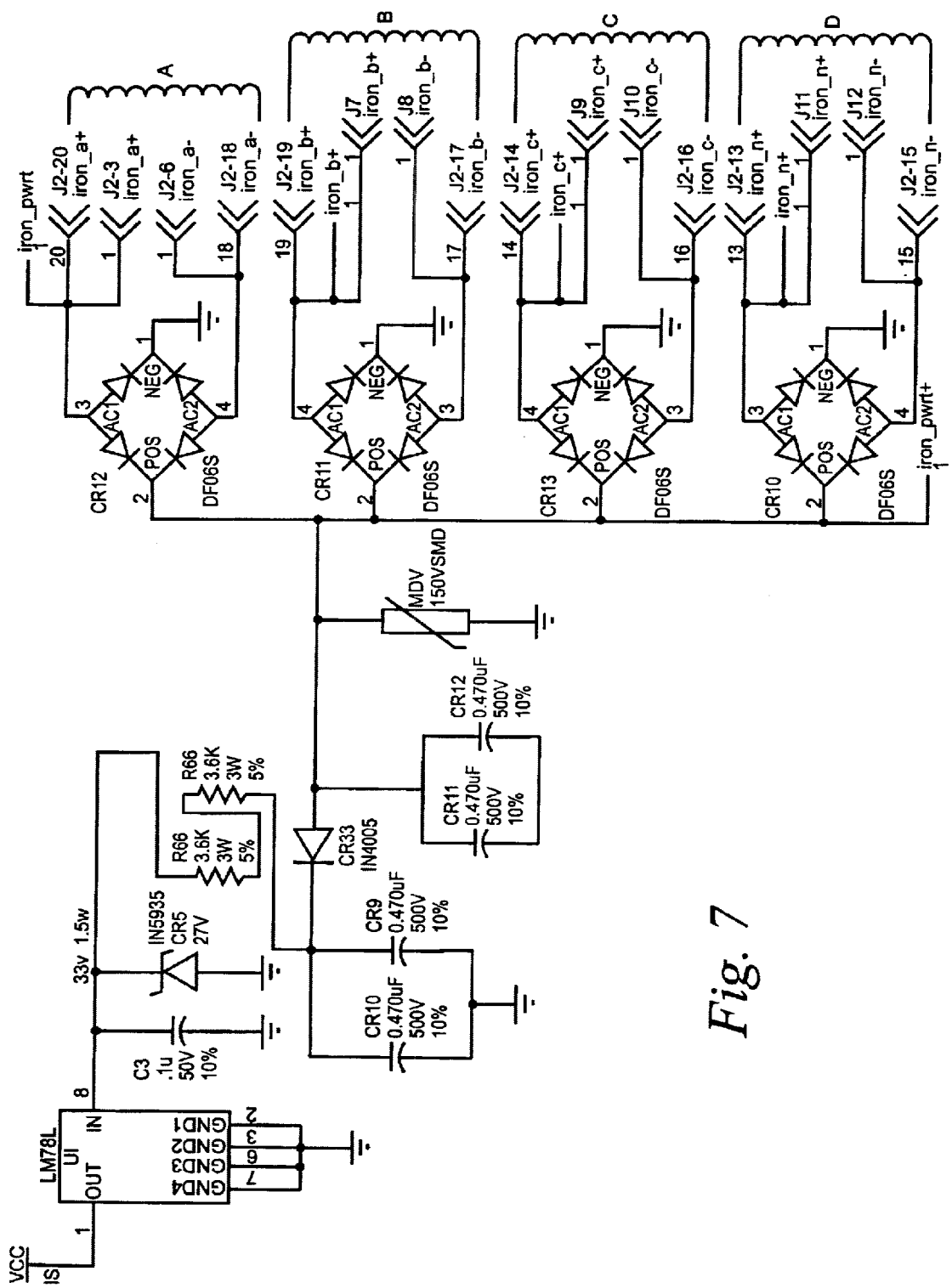
FIG. 7 is a circuit diagram for the power supply to the inventive trip system.

Power to the system 10 is supplied by a transformer 26 on each of the poles a, b, c, and n as described in more detail in FIG. 7. Each transformer 26 has an output to the power supply and one to the declining circuit inhibitor circuit 30 for each pole. The outputs of the power supply provide power for the tripping solenoid 20 and also for the low voltage circuitry. An MOV provides overvoltage protection for the other components ion the power supply. Two storage capacitors C11 and C12 provide energy storage for the high voltage (solenoid) supply. Capacitors C9 and C10 provide energy storage for the low voltage portion of the supply. R65 and R66 are dropping resistors and CR5 is a voltage clamp providing protection for the input of the regulator U1. The capacitor C3 provides noise reduction and some energy storage for the regulator U1. The output of the regulator U1 is nominally about 15 volts and supplies power to the sensing and declining circuit inhibitor circuit 30.

As those skilled in the art will appreciate, the inventive trip system 10 can be adapted and configured for use with a wide variety of circuit breakers and other circuit interrupters. The present invention is suitable for use in low, medium, and high voltage applications and in various phase configurations. The term circuit breaker is defined to include all types of circuit interrupters as well as, but not be limited to, single or polyphase circuit breakers, vacuum or air breakers, fusible switches, and the like.

While particular embodiments and applications of the present invention have been illustrated and described, it is to be understood that the invention is not limited to the precise construction disclosed herein and that modifications, changes, and variations which will be apparent to those skilled in the art may be made in the arrangement, operation and details of construction of the invention disclosed herein without departing from the spirit and scope of the invention as defined in the appended claims.

What is claimed is:

1. A trip circuit for a circuit breaker having a tripping mechanism and a breaker pole, the trip circuit comprising:
    a sensor to determine a rate of change in the current level and generate a rate of change signal;
    a positive detector connected to the sensor to determine a positive current direction and generate a positive current signal;
    a negative detector connected to the sensor to determine a negative current direction and generate a negative current signal;
    a declining current inhibit circuit connected to the positive and negative detectors, the declining current inhibit circuit allowing the positive and negative detectors to generate the respective positive and negative current signal only when the current being measured is increasing in either a positive or negative direction from zero;
    an electronic switch connected to the tripping mechanism of the circuit breaker and the positive and negative detectors, the electronic switch activating the tripping mechanism of the circuit breaker as a result of receiving the positive current signal or negative current signal;
    a power supply connected to the tripping mechanism and the electronic switch; and
    a current limiter connected to the power supply and the tripping mechanism, the current limiter allowing an initial high voltage to activate the tripping mechanism quickly but subsequently limit the current to prevent damage to the tripping mechanism.

2. The trip circuit of claim 1 wherein the declining current inhibit circuit includes receiving a series of pulses of alternating positive and negative direction from the sensor, a positive direction pulse creating a SET condition which inhibits a negative current signal increasing towards zero, and a negative direction pulse creating a RESET condition which inhibits a positive current signal increasing towards zero.

3. The trip circuit of claim 1 wherein the sensor includes a sensing coil connected to the breaker pole, the sensing coil generating a rate of change signal which is sent to the positive detector and the negative detector.

4. The trip circuit of claim 1 wherein the power supply includes a saturating core transformer connected to the breaker pole.

5. The trip circuit of claim 1 wherein the electronic switch includes a gate which generates a signal to activate the tripping mechanism upon receiving either the positive current signal and negative current signal.

6. The trip circuit of claim 1 wherein the positive detector includes a reference threshold, the positive detector sending the positive current signal to the electronic switch when the rate of current change signal received from the sensor exceeds the reference threshold.

7. The trip circuit of claim 1 wherein the negative detector includes a negative reference threshold and an invertor circuit for inverting the rate of change signal received from the sensor, the negative detector sending the negative current signal to the electronic switch when the inverted rate of change signal matches the negative reference threshold.

8. A trip circuit for a circuit breaker having multiple phases, a tripping mechanism and a breaker pole, the trip circuit comprising:
    each phase of the circuit breaker having:
        a sensor to determine a rate of change in the current level and generate a rate of change signal;
        a positive detector connected to the sensor to determine a positive current direction and generate a positive current signal; and
        a negative detector connected to the sensor to determine a negative current direction and generate a negative current signal;
        a declining current inhibit circuit connecting to the positive and negative detectors, the declining current inhibit circuit allows the positive and negative detectors to generate the respective positive and negative current signal only when the current being measured is increasing in either a positive or negative direction from zero;
    the trip circuit having an electronic switch connected to the tripping mechanism of the circuit breaker and the positive and negative sensors, the electronic switch activating the tripping mechanism of the circuit breaker as a result of receiving the positive current signal and negative current signal;
    a power supply connected to the tripping mechanism and the electronic switch; and
    a current limiter connected to the power supply and the tripping mechanism, the current limiter allowing an initial high voltage to activate the tripping mechanism quickly but subsequently limit the current to prevent damage to the tripping mechanism.

9. The trip circuit of claim 8 wherein the declining current inhibit circuit includes receiving a series of pulses of alternating positive and negative direction from the sensor, a positive direction pulse creating a SET condition which inhibits a negative current signal increasing towards zero, and a negative direction pulse creating a RESET condition which inhibits a positive current signal increasing towards zero.

10. The trip circuit of claim 8 wherein the sensor includes a sensing coil connected to the breaker pole, the sensing coil generating a rate of change signal which is sent to the positive detector and the negative detector.

11. The trip circuit of claim 8 wherein the power supply includes a saturating core transformer connected to the breaker pole.

12. The trip circuit of claim 8 wherein the electronic switch includes a gate which generates a signal to activate the tripping mechanism upon receiving either the positive current signal and negative current signal.

13. The trip circuit of claim 8 wherein the positive detector includes a reference threshold, the positive detector sending the positive current signal to the electronic switch when the rate of current change signal received from the sensor exceeds the reference threshold.

14. The trip circuit of claim 8 wherein the negative detector includes a negative reference threshold and an invertor circuit for inverting the rate of change signal received from the sensor, the negative detector sending the negative current signal to the electronic switch when the inverted rate of change signal matches the negative reference threshold.

15. A method of activating a tripping mechanism for a circuit breaker having a tripping mechanism and a breaker pole, the method comprising:

- sensing a rate of change in the current level and generating a rate of change signal;
- determining a positive current direction and generating a positive current signal;
- determining a negative current direction and generating a negative current signal;
- inhibiting the positive and negative detectors from generating the respective positive and negative current signal when the current being measured is increasing in either a positive or negative direction from zero;
- activating the tripping mechanism of the circuit breaker as a result of receiving the positive current signal and negative current signal; and
- limiting the current to the tripping mechanism so that an initial high voltage activates the tripping mechanism quickly but subsequently limits the current to prevent damage to the tripping mechanism.

* * * * *